United States Patent Office 3,345,342
Patented Oct. 3, 1967

3,345,342
PROCESS FOR PREPARING POLYIMIDE POLYMERS
Rudolph J. Angelo, Wilmington, Del., assignor to E. I. du Pont de Nemours and Company, Wilmington, Del., a corporation of Delaware
No Drawing. Original application Nov. 21, 1963, Ser. No. 325,479, now Patent No. 3,282,898, dated Nov. 1, 1966. Divided and this application May 31, 1966, Ser. No. 553,651
4 Claims. (Cl. 260—78)

This application is a divisional of my copending application Ser. No. 325,479 filed Nov. 21, 1963, now U.S. Patent No. 3,282,898.

This invention relates to the preparation of novel polymeric articles and coatings.

The polymeric articles and coatings consist essentially of polyisoimide or, more accurately, polyiminolactone.[1] Such polymers consist essentially of recurring units having the formula:

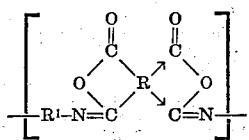

wherein the arrows denote isomerism;[2] R is an aromatic tetravalent organic radical; and $R^1$ is arylene.

These polymers are prepared by treating a polyamide-acid with N,N'-disubstituted carbodiimides of the formula $R^7-N=C=N-R^7$ wherein $R^7$ is alkyl or aryl, preferably n-butyl, phenyl, meta-tolyl, para-tolyl, meta-chlorophenyl, para-chlorophenyl, meta-nitrophenyl, cyclohexyl, para-methoxy phenyl or alpha-naphthyl under conditions to form the polyiminolactone.

The polyiminolactone compositions may be used as such to form shaped articles, e.g., films, filaments, or they may, after shaping, be converted by heat, i.e. by heating above about 300° C., or treatment with triethylammonium acetate to the corresponding polyimide or they may be converted to the corresponding polyamide-ester. Some representative uses of shaped articles of the polyiminolactone compositions follow. The composition may be used as an overwrap for a water-sensitive signal device for tracer work. The polyiminolactone covering, being of low hydrolytic stability, would decompose in water and, thus, expose the signal device for activation by the water. Because of its low hydrolytic stability and its thermal stability up to 300° C., the polyiminolactone as a film or filament could be used to sense small amounts of water in electric transformers and, thus, prevent them from burning out. This same combination of properties will permit the film to be used as a water-sensitive, thermally-stable relief valve. Since polyiminolactone will convert to polyimide directly at high temperature, the amount of conversion measured by infrared techniques may be used to determine temperature. Since polyiminolactone displays intermediate resistivity ($10^{10}$–$10^{11}$ ohm-cm.), it may be used as an antistatic film where humidity is low, e.g., as a liner in conduits used for conveying dry, non-conducting materials that are sensitive to sparks (flour, hydrazine).

The polyamide-acid composition may be prepared by reacting at least one aromatic diamine having the structural formula $H_2N-R^1-NH_2$ with at least one tetracarboxylic acid dianhydride having the structural formula

[1] Anhydrides of acids in which the C=O groups are ortho give 5-imino-γ-lactones. Anhydrides of acids in which the C=O groups are peri give 6-imino-δ-lactones.
[2] In any recurring unit the groups to which arrows point may exist as shown or in interchanged position.

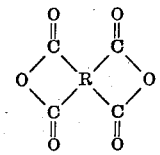

wherein R is a tetravalent aromatic radical and $R^1$ is arylene, in an organic solvent for at least one of the reactants, the solvent being inert to the reactants, preferably under anhydrous conditions, for a time and at a temperature sufficient to provide the polyamide-acid having recurring units of:

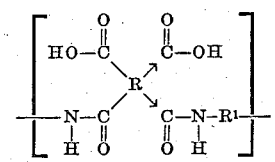

It should be understood that it is not necessary that the polymeric component of the composition be composed entirely of the polyamide-acid. This is particularly true since conversion to another polymer is contemplated subsequently.

Furthermore, in determining a specific time and a specific temperature for forming the polyamide-acid of a specified diamine and a specified dianhydride, several factors must be considered. The maximum permissible temperature will depend on the diamine used, the dianhydride used, the particular solvent, the percentage of polyamide-acid desired in the final composition and the minimum period of time that one desires for the reaction. For most combinations of diamines and dianhydrides falling within the definitions given above, it is possible to form compositions of 100% polyamide-acid by conducting the reaction below 100° C. However, temperatures up to 175° C. may be tolerated to provide acceptable compositions. The particular temperature below 175° C. that must not be exceeded for any particular combination of diamine, dianhydride, solvent and reaction time to provide a reaction product composed of the desired minimum of polyamide-acid will vary but can be determined by a simple test by any person of ordinary skill in the art. However, to obtain the maximum inherent viscosity, i.e., maximum degree of polymerization, for any particular combination of diamine, dianhydride, solvent, etc., and thus produce ultimately shaped articles such as films and filaments of optimum toughness, it has been found that the temperature throughout the reaction should be maintained below 60° C., preferably below 50° C.

The degree of polymerization of the polyamide-acid is subject to deliberate control. The use of equal molar amounts of the reactants under the prescribed conditions provides polyamide-acids of very high molecular weight. The use of either reactant in large excess limits the extent of polymerization. Besides using an excess of one reactant to limit the molecular weight of the polyamide-acid, a chain terminating agent such as phthalic anhydride may be used to "cap" the ends of the polymer chains.

In the preparation of the polyamide-acid, it is desired that the molecular weight be such that the inherent viscosity of the polymer is at least 0.1, preferably 0.3–5.0. The inherent viscosity is measured at 30° C. at a concentration of 0.5% by weight of the polymer in a suitable solvent, e.g., N,N-dimethylacetamide. To calculate inherent viscosity, the viscosity of the polymer solution is measured relative to that of the solvent alone.

Inherent viscosity =

$$\dfrac{\text{natural logarithm } \dfrac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

The quantity of organic solvent used in the process need only be sufficient to dissolve enough of one reactant, preferably the diamine, to initiate the reaction of the diamine and the dianhydride. It has been found that the most successful results are obtained when the solvent represents at least 60% of the final solution. That is, the solution should contain 0.05–40% of the polymeric component.

By use of the term "solution," whether it is a solution of the polyamide-acid or the polyiminolactone, it is meant to define a solid dissolved in a liquid and vice versa. These latter, liquids dissolved in solids, are commonly called gels. The gels may exist as homogeneous masses of liquid and solid in any form.

The starting materials for forming the polyamide-acids are aromatic diamines and aromatic tetracarboxylic acid dianhydrides. The organic diamines are characterized by the formula:

$$H_2N-R^1-NH_2$$

wherein $R^1$ is a divalent aromatic radical (arylene), preferably selected from the following groups: phenylene, naphthylene, biphenylene, anthrylene, furylene, benzfurylene and

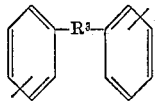

wherein $R^3$ is selected from the group consisting of an alkylene chain having 1–3 carbon atoms,

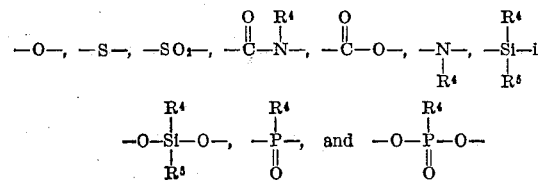

wherein $R^4$ and $R^5$ are alkyl or aryl, and substituted groups thereof. Among the diamines which are suitable for use in the present invention are: meta-phenylene diamine; para-phenylene diamine; 2,2-bis(4-amino-phenyl) propane; 4,4'-diamino-diphenyl methane; 4,4'-diamino-diphenyl sulfide; 4,4'-diamino-diphenyl sulfone; 3,3'-diamino-diphenyl sulfone; 4,4'-diamino-diphenyl ether; 2,6-diamino-pyridine; bis-(4-amino-phenyl) diethyl silane; bis-(4-amino-phenyl) diphenyl silane; benzidine; 3,3'-dichloro-benzidine; 3,3'-dimethoxy benzidine; bis-(4-amino-phenyl) ethyl phosphine oxide; bis-(4-amino-phenyl) phenyl phosphine oxide; bis-(4-amino-phenyl)-N-butylamine; bis-(4-amino-phenyl) - N - methylamine; 1,5-diamino-naphthalene; 3,3' - dimethyl-4,4'-diaminobiphenyl; N-(3-aminophenyl)-4-aminobenzamide; 4 - aminophenyl-3-aminobenzoate; and mixtures thereof.

The aromatic tetracarboxylic acid dianhydrides are characterized by the following formula:

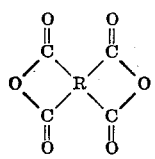

wherein R is a tetravalent aromatic radical, e.g.

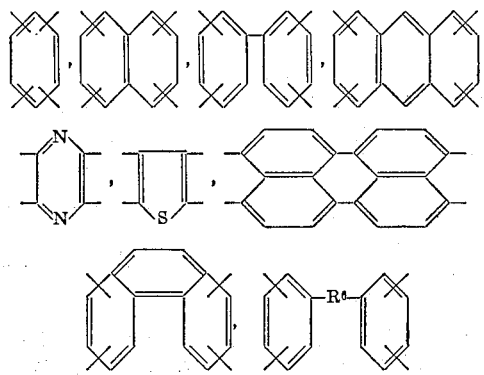

wherein $R^6$ is selected from the group consisting of $R^3$ and

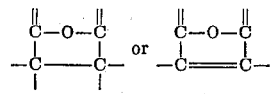

In these dianhydrides every carbonyl group is attached directly to a separate carbon atom of the aromatic radical, the carbonyl groups being in pairs, the groups of each pair being adjacent to each other. Adjacent means ortho or peri, so that the dicarboxylanhydro rings are 5- or 6-membered, respectively.

The preferred aromatic dianhydrides are those in which the carbon atoms of each pair of carbonyl groups are directly attached to ortho carbon atoms in the R group to provide a 5-membered ring as follows:

$$\begin{matrix} \overset{\text{O}}{\overset{\|}{\text{C}}}-\text{O}-\overset{\text{O}}{\overset{\|}{\text{C}}} & & \overset{\text{O}}{\overset{\|}{\text{C}}}-\text{O}-\overset{\text{O}}{\overset{\|}{\text{C}}} \\ | & \text{or} & \| \\ -\text{C}-\!\!-\!\!-\text{C}- & & -\text{C}=\!\!=\!\!=\text{C}- \\ | & & \end{matrix}$$

Illustrations of dianhydrides suitable for use in the present invention include: pyromellitic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 2,2',3,3'-diphenyl tetracarboxylic dianhydride; 2,2-bis(3,4-dicarboxyphenyl)propane dianhydride; bis(3,4-dicarboxyphenyl) sulfone dianhydride; 3,4,9,10-perylene tetracarboxylic dianhydride; bis(3,4-dicarboxyphenyl) ether dianhydride; naphthalene-1,2,4,5-tetracarboxylic dianhydride; naphthalene-1,4,5,8-tetracarboxylic dianhydride; 2,6 - dichloronaphthalene - 1,4,5,8 - tetracarboxylic dianhydride; 2,7-dichloronaphthalene-1,4,5,8-tetracarboxylic dianhydride; 2,3,6,7-tetrachloronaphthalene - 1,4,5,8 - tetracarboxylic dianhydride; phenanthrene-1,8,9,10 - tetracarboxylic dianhydride; 2,2 - bis(2,3 - dicarboxyphenyl) propane dianhydride; 1,1-bis(2,3-dicarboxyphenyl) ethane dianhydride; 1,1-bis(3,4-dicarboxyphenyl) ethane dianhydride; bis (2,3-dicarboxyphenyl) methane dianhydride; bis(3,4-dicarboxyphenyl) methane dianhydride; bis(3,4-dicarboxyphenyl) sulfone dianhydride; benzene-1,2,3,4-tetracarboxylic dianhydride; 3,4,3',4'-benzophenone tetracarboxylic dianhydride; 2,3,2',3'-benzophenone tetracarboxylic dianhydride; 2,3,3',4'-benzophenone tetracarboxylic dianhydride; pyrazine-2,3,5,6-tetracarboxylic dianhydride; thiophene-2,3,4,5-tetracarboxylic dianhydride; etc.

The inclusion of one or more diamines or dianhydrides other than those disclosed, e.g. aliphatic diamines or aliphatic dianhydrides, as reactants in the process may detract from one or more desirable properties of the polymeric products. However, the inclusion of such materials, to the extent that they do not detract substantially from the desirable results obtained with the aromatic reactants, is contemplated.

The solvents useful in the solution polymerization process for synthesizing the polyamide-acid compositions are the organic solvents whose functional groups do not react with either of the reactants (the diamines or the dianhydrides) to any appreciable extent. Besides being inert to the system, and preferably, being a solvent for the polyamide-acid, the organic solvent should be a solvent for at least one of the reactants, preferably for both of the reactants. To state it another way, the organic solvent is an organic liquid other than either reactant or homologs of the reactants that is a solvent for at least 1 reactant, and contains functional groups, the functional groups being groups other than monofunctional primary and secondary amino groups and other than the monofunctional dicarboxylanhydro groups. The normally liquid organic solvents of the N,N-dialkylcarboxylamide class are useful as solvents in the process. The preferred solvents are the lower molecular weight members of this class, particularly N,N-dimethylformamide and N,N-dimethylacetamide. They may easily be removed from the polyamide-acid and/or polymeric shaped articles by evaporation, displacement or diffusion. Other typical compounds of this useful class of solvents are: N,N-diethylformamide, N,N-diethylacetamide, N,N-dimethylmethoxy acetamide, N-methyl caprolactam, etc. Other solvents which may be used are: dimethylsulfoxide, N-methyl-2-pyrrolidone, tetramethyl urea, pyridine, dimethylsulfone, hexamethylphosphoramide, tetramethylene sulfone, formamide, N-methylformamide and butyrolactone. The solvents can be used alone, in combinations of solvents, or in combination with poor solvents such as benzene, benzonitrile, dioxane, xylene, toluene and cyclohexane.

In the next step, the polyamide-acid is converted to a polylactone having the formula:

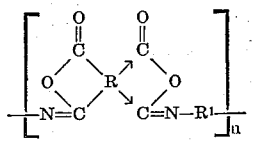

$n$ being an integer sufficiently high to provide a film-forming polymer, i.e., having an inherent viscosity at 30° C. of at least 0.1, preferably 0.3–5.0, as measured as a 0.5% solution in a suitable solvent (concentrated sulfuric acid, N,N-dimethylacetamide, etc.). This is accomplished by adding an N,N′-disubstituted carbodiimide in a solvent, e.g., N,N-dicyclohexyl carbodiimide in N,N-dimethylacetamide. The solvent is usually the same solvent that had been used in forming the polyamide-acid. It is necessary to add at least the stoichiometric amount of the carbodiimide (at least 1 mole per amide-acid linkage). Water is removed and adds to the carbodiimide converting the latter to a substituted urea:

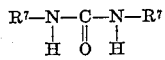

The urea usually precipitates and is removed by centrifuging or filtering, leaving a solution (as defined previously) of the polylactone. If the urea does not precipitate, it can be removed by washing.

As stated previously, the polyiminolactone compositions may be used as such to form shaped articles, e.g., films, filaments or they may, after shaping, be converted by heat or treatment with triethylammonium acetate to the corresponding polyimide or they may be converted to the corresponding polyamide-ester, polyamide-amide or polytetrazole acid. Conversion to polyamide-ester is the subject of copending U.S. application Ser. No. 325,497, filed Nov. 21, 1963, by William E. Tatum and assigned to the assignee of the present application. In this process, the polylactone composition is treated with an alcohol or thiol to form the corresponding polyamide-ester or thioester. Conversion to polyamide-amide is the subject of copending U.S. application Ser. No. 325,442, filed Nov. 21, 1963, by R. J. Angelo and W. E. Tatum, and assigned to the assignee of the present application. In this process, the polylactone composition is treated with ammonia, an amine or a diamine to form the corresponding polyamide-amide. Conversion to polytetrazole acid is the subject of copending U.S. application Ser. No. 325,469, filed Nov. 21, 1963, by William E. Tatum and Roger L. Thornton and assigned to the assignee of the present application. In this process, the polylactone composition is treated with hydrazoic acid to form the corresponding polytetrazole acid. These conversions may be carried out on a solution of the polylactone or on a shaped structure such as a film, filament, tube, etc. Where these polymeric compositions are obtained as solutions, they may be stored for later use or they may be immediately used to form shaped articles. Although they are useful as shaped articles, it is preferred to convert them to another polymer to modify the properties of the shaped structure. Thus, they may be converted by heat treatment to the corresponding polyimide, which has the following structural formula:

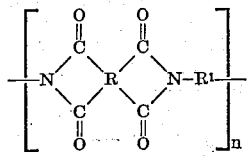

wherein R is an aromatic tetravalent radical; $R^1$ is arylene; and $n$ is an integer sufficiently high to provide an inherent viscosity of at least 0.1, preferably 0.3–5.0, as measured as a 0.5% solution in a suitable solvent.

It has been found that in many cases, the polyamide-ester, polytetrazole acid and polyamide-amide articles can be converted to polyimide articles at very modest temperatures, thus tending to reduce any adverse effects of high temperature on the articles or materials that may have been incorporated into the articles.

Instead of being shaped itself or converted to another polymer, the polylactone with solvent can be used as a coating composition or as an adhesive layer, being converted in situ to the corresponding polyimide. The liquid composition containing the polymer, either alone or modified by the addition of fillers and/or foaming agents, may be applied by any of the usual techniques (doctoring, rolling, dipping, brushing, spraying) to a great variety of substrates. Such substrates include copper, brass, aluminum, steel, and other metals in the form of sheets, fibers, wires, screening; mineral structures such as asbestos; glass in the form of sheets, fibers, foams, fabrics, etc.; polymeric materials such as cellulosic materials (cellophane, wood, paper, etc.) polyolefins (polyethylene, polypropylene, polystyrene, etc.); polyesters (polyethylene terephthalate, etc.), polyamides, polyimides, perfluorocarbon polymers (polytetrafluoroethylene, copolymers of tetrafluoroethylene with hexafluoropropylene, etc), polyurethanes, in the form of sheets, fibers, foams, woven and non-woven fabrics, screening, etc.; leather sheets; etc. The polymeric substrates can be metallized before coating, or treated with a conventional adhesive or other agent to improve surface receptivity. The same substrate materials may be used as top layers over the previously-coated substrates to provide laminates wherein the polymeric composition serves as an adhesive layer. Of course, the adhesive layer can be a prefomed film of the polyiminolactone composition.

The invention will be more clearly understood by referring to the examples which follow, Example 1 representing the best mode contemplated for practicing the invention. It is understood that the examples, although illustrating specific embodiments of the present invention, should not be considered limitative of the invention.

The determination of the structure is accomplished by Infrared Spectral Techniques [3] known to those skilled in the art. The majority of the infrared spectra herein were taken on cast films by the use of a Perkin-Elmer Model 21 Spectrophotometer and a Perkin-Elmer Infracord Spectrophotometer.

---

[3] W. M. D. Bryant and R. C. Voter, Journal of American Chemical Society, 75, 6113 (1953); and F. W. Billmeyer, "Textbook of Polymer Chemistry," chapter 7, Interscience Publishers, 1957.

Inherent viscosity, which is directly related to the molecular weight of the polymer, is defined by L. H. Cragg in the Journal of Colloid Science, volume I, pages 261–9 (May 1946) as:

$$\text{Inherent viscosity} = \frac{\ln \text{relative viscosity}}{C}$$

where relative viscosity is the ratio of the solution viscosity to the solvent viscosity, and C is the concentration of solute in solution measured as grams of polymer per 100 ml. of solution.

*Example 1*

To a nitrogen-blanketed vessel is added 24.6 g. of a 15% by weight solution in N,N-dimethylacetamide containing 0.01 mole of the polyamide-acid of pyromellitic dianhydride and 2,4-diaminocumene (containing 0.01 mole of polyamide-acid; 0.02 mole, based on amide-acid linkages), the polyamide-acid having been prepared in a manner similar to that in Example 2. N,N-dicyclohexyl carbodiimide (4.53 g., 0.022 mole) in 15 ml. of N,N-dimethylacetamide is added dropwise over 15 min. with agitation. During this time the color of the solution intensifies and precipitation of N,N'-dicyclohexyl urea is observed. The suspension is agitated overnight and then centrifuged to settle out the N,N'-dicyclohexyl urea. The solution is decanted and centrifuged, and the sequence is repeated. The final solution is diluted with 15 ml. of N,N-dimethylacetamide and clarified by filtration.

A portion of this solution is cast into film of 0.1 mil thickness by means of a thin, miniature doctor blade. Solvent removal is accomplished in a vacuum oven under nitrogen. The resulting 0.1 ml. film, brilliant yellow in color, exhibits infrared and ultraviolet absorption spectra expected for the iminolactone structure:

IR: 5.55 and 10.0–11.0 microns—very strong (iminolactone); 13.85 microns—absent (normal imide)
UV: Pronounced maximum at 3750 A.

and has an inherent viscosity of about 1.

*Example 2*

A mixture of 29.7 g. (0.15 mole) of 4,4'-diaminodiphenyl methane and 32.70 g. (0.15 mole) of pyromellitic dianhydride is dissolved in 266 ml. of dimethylformamide at room temperature. The solution is agitated without supplemental heating or cooling until it has become extremely viscous. Then three 110-ml. portions of dimethylformamide are added to dilute the solution to 10% solids. The inherent viscosity of a sample of the polyamide-acid product is found to be 2.17 (as a 0.5% solution in N,N-dimethylformamide at 30° C.).

To 20.0 g. (0.005 mole of polyamide-acid unit) of the polyamide-acid is added 2.06 g. (0.01 mole) of N,N'-dicyclohexylcarbodiimide. On moderate stirring the reaction mixture becomes yellow and gels. A yellow precipitate isolated from the mixture is less soluble than the polyamide-acid in amide solvents and in bases, and is identified by infrared spectra as the poly(iminolactone).

*Example 3*

A thin layer of a 9.18% by weight solution in N,N-dimethylacetamide of the polyamide-acid of pyromellitic dianhydride and 4,4'-diaminodiphenyl ether (inherent viscosity 2.98) prepared as in Example 2 is cast onto a small glass plate with a miniature doctor knife and is then immersed in a bath containing 5.0 grams of N,N'-dicyclohexyl carbodiimide in 30 ml. of dimethylformamide and 70 ml. of N,N-dimethylacetamide. Instantaneously, the outline of the wet film on the glass plate is seen due to the immediate color change, first to yellow and then to orange. The film is allowed to remain in contact with the carbodiimide solution for 8 minutes. The film is then peeled from the glass plate while still in the bath and transferred to a methylene chloride bath. After washing for several minutes in methylene chloride, the film is transferred to a new bath of methylene chloride and finally to one of heptane. Drying is accomplished at 50° C. in a forced-draft oven.

The infrared spectrum of the product is consistent with that expected for the iminolactone structure:

5.55 and 10.9 microns—very strong (iminolactone)
13.85 microns—very weak (normal imide)

This film has a zero strength temperature of about 700° C., a density of 1.35 g./cm.$^3$ and a modulus of about 400K. p.s.i. at 23° C.

*Example 4*

A film of the polyamide-acid of pyromelletic dianhydride and 4,4'-diaminodiphenyl methane is soaked for 24 hours at room temperature in a converting solution consisting of 20 g. of N,N'-dicyclohexylcarbodiimide in 20 g. of pyridine and 360 g. of cyclohexane. The product is washed with dioxane and vacuum dried for 8 hours at 50–100° C. At this stage the product is a polyiminolactone. A sample can be annealed for several seconds at 350–400° C. to form the polyimide.

*Examples 5–9*

When a gel film of each of the following polyamide-acids is soaked in the converting solution of Example 4, the polymer changes to the corresponding polyiminolactone:

Ex. 5—polyamide-acid of 3,4,3',4'-benzophenonetetracarboxylic dianhydride and m-phenylenediamine
Ex. 6—polyamide-acid of 2,2',3,3'-diphenyl tetracarboxylic dianhydride and 4,4'-diamino-diphenyl ether
Ex. 7—polyamide-acid of pyromellitic dianhydride and 4,4'-diamino-diphenyl sulfone
Ex. 8—polyamide-acid of bis(3,4-dicarboxyphenyl)ether dianhydride and 4,4'-diamino-diphenyl sulfide
Ex. 9—polyamide-acid of pyromellitic dianhydride and 4,4'-diaminodiphenyl methane.

*Example 10*

A film of the polyamide-acid of pyromellitic dianhydride and 4,4'-diamino-diphenyl methane is soaked for 24 hours at room temperature in a solution of 2 g. of N,N'-dicyclohexylcarbodiimide in 36 g. of benzene and 2 mls. of pyridine. The resulting yellow film is washed in benzene; is blotted dry; and is tested. Its infrared spectrum disclose the presence of a substantial amount of the iminolactone structure (absorbance at approximately 10.85 microns). The film displays a tensile modulus of 350K. p.s.i., a tensile strength of 9800 p.s.i. and an elongation at break of 3.4%.

The invention claimed is:
1. The process comprising heating in polyiminolactone consisting essentially of recurring units of the formula

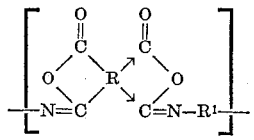

wherein the arrows denote isomerism; R is a tetravalent aromatic radical selected from the group consisting of

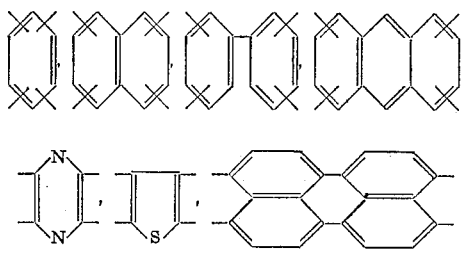

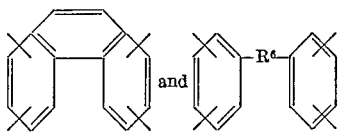

where R⁶ is selected from the group consisting of alkylene of 1–3 carbon atoms;

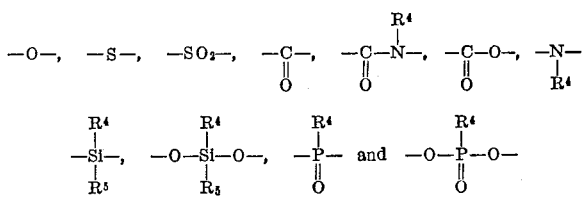

where R⁴ and R⁵ are selected from the group consisting of alkyl and aryl; and R¹ is a divalent aromatic radical selected from the group consisting of phenylene, naphthylene, biphenylene, anthrylene, furylene, benzfurylene and

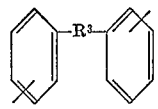

where R³ is selected from the group consisting of alkylene of 1–3 carbon atoms,

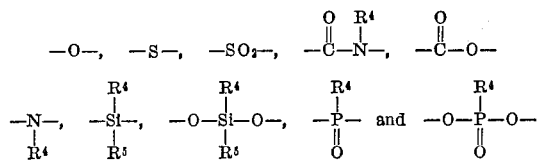

where R⁴ and R⁵ are selected from the group consisting of alkyl and aryl; at a temperature above about 300° C. for a time sufficient to form a polyimide consisting essentially of recurring units of the formula

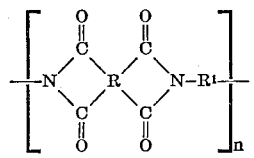

where R and R¹ have the same meaning as above; and $n$ is a positive integer sufficient to provide a polyimide having an inherent viscosity of at least 0.1 as measured at 30° C. on an 0.5% by weight solution in concentrated sulfuric acid.

2. The process of claim 1 wherein R is selected from the group consisting of the aromatic radicals in pyromellitic dianhydride, 2,3,6,7-naphthalene tetracarboxylic dianhydride, 3,3',4,4'-diphenyl tetracarboxylic dianhydride, 1,2,5,6-naphthalene tetracarboxylic dianhydride, 2,2',3,3'-diphenyl tetracarboxylic dianhydride, 2,2-bis(3,4-dicarboxyphenyl) propane dianhydride, bis(3,4-dicarboxyphenyl) sulfone dianhydride, 3,4,9,10-perylene tetracarboxylic acid dianhydride and bis(3,4-dicarboxyphenyl) ether dianhydride and 3,4,3',4'-benzophenone tetracarboxylic dianhydride.

3. The process of claim 1 wherein R¹ is selected from the group consisting of arylene radicals in metaphenylenediamine, paraphenylenediamine, benzidine, 4,4'-diaminodiphenyl propane, 4,4'-diamino-diphenyl methane, 4,4'-diamino-diphenyl ether, 4,4'-diamino-diphenyl sulfone, 2,4-diaminocumene and 4,4'-diamino-diphenyl sulfide.

4. The process of claim 1 wherein R is the aromatic radical in pyromellitic dianhydride and R¹ is the arylene radical in 4,4'-diaminodiphenyl methane.

References Cited
UNITED STATES PATENTS 3,261,811   7/1966   Tatum _____ 260—65

SAMUEL H. BLECH, *Primary Examiner.*

WILLIAM H. SHORT, *Examiner.*

H. D. ANDERSON, *Assistant Examiner.*